United States Patent [19]

Mori et al.

[11] Patent Number: 5,190,499
[45] Date of Patent: Mar. 2, 1993

[54] TORQUE LIMITER ARRANGEMENT FOR ROTATING DEVICE

[75] Inventors: Keiji Mori, Kariya; Hidekazu Kogita, Toyota, both of Japan

[73] Assignee: Aisin Seiki K.K., Kariya, Japan

[21] Appl. No.: 591,640

[22] Filed: Oct. 2, 1990

[30] Foreign Application Priority Data

Oct. 2, 1989 [JP] Japan .................. 1-257549

[51] Int. Cl.$^5$ ............... G02B 7/18; F16D 7/06
[52] U.S. Cl. ..................... 464/36; 359/841; 359/877
[58] Field of Search ............. 464/36, 30, 35, 37, 464/38, 41; 192/56 R, 48.1, 48.7; 350/636, 637, 632, 604, 605; 248/548, 549, 900

[56] References Cited

U.S. PATENT DOCUMENTS

| 3,754,412 | 8/1973 | Briggs | 464/36 X |
| 4,158,483 | 6/1979 | Fisher et al. | 359/876 |
| 4,386,689 | 6/1983 | Kato | 464/36 X |
| 4,430,909 | 2/1984 | Magnuson | 254/344 |
| 4,548,305 | 10/1985 | Anderson | 464/36 X |
| 4,626,083 | 12/1986 | Nakayama et al. | 350/604 |
| 4,626,084 | 12/1986 | Kumai | 359/877 X |
| 4,786,157 | 11/1988 | Mori et al. | 350/637 |
| 4,832,477 | 5/1989 | Torii et al. | 248/900 X |
| 4,838,400 | 6/1990 | Fortune | 464/36 X |
| 4,919,526 | 4/1990 | Umekawa et al. | 350/637 X |
| 4,981,349 | 1/1991 | Tamiya et al. | 350/637 X |
| 5,012,693 | 5/1991 | Enomoto et al. | 350/637 X |

FOREIGN PATENT DOCUMENTS

| 3139140 | 10/1984 | Fed. Rep. of Germany . |
| 3610975 | 4/1989 | Fed. Rep. of Germany . |
| 61-12452 | 1/1986 | Japan . |

*Primary Examiner*—Daniel P. Stodola
*Attorney, Agent, or Firm*—Sughrue, Mion, Zinn Macpeak & Seas

[57] ABSTRACT

A torque limiter arrangement is used for a rotating device like a door mirror. The arrangement controls relative rotation between a fixed element and a rotational element which are drivingly connected by a drive unit. That is, a first clutch is released when a relative torque not less than a fixed first torque is effected between the fixed element and the rotational element. A second clutch is released when a relative torque not less than a fixed second torque is applied between the fixed element and the rotational element. A first spring is operatively connected with the first clutch to determine the first torque. A second spring is operatively connected with the second clutch to determine the second torque.

7 Claims, 4 Drawing Sheets

TORQUE LIMITER ARRANGEMENT FOR ROTATING DEVICE

BACKGROUND OF THE INVENTION

1. Field of the Invention

This invention relates generally to torque limiter arrangements for rotating devices such as electric retractable door mirrors, and more particularly to torque limiter arrangements for rotating devices which can be rotated by external force.

2. Description of the Related Art

Electric door mirrors have torque limiting mechanisms on a way of power transmission devices of drive assemblies. The torque limiter prevents overload of a motor, damps shocks due to external force, and makes it possible to manually fold the mirror.

The door mirror rotates between a fixed return position and a fixed retracted position in response to rotation of the motor. The torque limiter is released when external force is applied to the door mirror by hands or the like, thereby enabling rotation of the mirror, whether or not the motor is driven.

In these door mirrors, a release torque of the torque limiter is set higher than a rotational resistance of a mirror body. However, the release torque decreases in long use of the torque limiter. Contrary thereto, the rotational resistance increases due to abrasion, rattles, dirt stick, etc., of the torque limiter. Thus, difference lessens between the release torque and the rotational resistance. When the torque becomes the same as the resistance, the drive assembly runs idle.

For example, Japanese Laid Open Patent Publication No. 61-12452, that is laid open to public inspection on Jan. 20, 1986, discloses a torque limiter arrangement used in an electric door mirror.

The arrangement has first and second torque limiters on a shaft of a base fixed to a car body. The first torque limiter has a predetermined rotational resistance or a first release torque between the fixed base and a rotating frame, to which a mirror is attached. The first torque limiter permits relative rotation between the base and the mirror when a torque not less than the first release torque is relatively applied to the base and the mirror. The second torque limiter has a fixed clutch on the shaft and a clutch gear drivingly coupled with a motor on the frame. The second torque limiter permits relative rotation between the fixed clutch and the clutch gear when a predetermined second release torque or more torque is relatively applied to the fixed clutch and the clutch gear.

There are provided a first set of balls and pockets, engageable with each other, around the shaft on opposite surfaces of the fixed clutch and the clutch gear. A second set of balls and pockets and similarly arranged on opposite surfaces of the base and the frame. A coil spring is disposed between the first and second torque limiters so as to urge each torque limiter and determine their release torques. Since the same urging force is given to each torque limiter, it is necessary to change an engaging depth of the ball in the pocket in the first set from that of the second set in order to obtain the difference between the release torques. However, it has a limitation to make the engaging depths different between the first set and the second set. Therefore, it is difficult to get the difference large between the release torques.

Moreover, in case the second limiter has been repeatedly used and has the edges of the pockets worn by the balls, the engaging depth is made smaller, thus decreasing the release torque thereof. When the release torque becomes the same as or smaller than the rotational resistance, the frame does not rotate relative to the base while the clutch gear is rotated relative to the fixed clutch. As a result, it is impossible to control rotation of the door mirror.

SUMMARY OF THE INVENTION

It is accordingly an object of this invention to provide a torque limiter arrangement for a rotating device which prevents a release torque from becoming not more than a rotational resistance due to its repeated use or the like.

In accordance with one preferred mode of this invention, a torque limiter arrangement for a rotating device is adapted to control relative rotation between a fixed element and a rotational element drivingly connected by a drive unit. A first clutch is released upon application of a relative torque not less than a predetermined first torque between the fixed element and the rotational element. A second clutch is released upon application of a relative torque not less than a predetermined second torque between the fixed element and the rotational element. A first spring is operatively connected with the first clutch to determine the first torque. A second spring is operatively connected with the second clutch to determine the second torque.

BRIEF DESCRIPTION OF THE ACCOMPANYING DRAWINGS

Further objects and advantages of this invention will become apparent from the following description, reference being had to the accompanying drawings wherein preferred embodiments of this invention are clearly shown.

DETAILED DESCRIPTION OF THE PREFERRED EMBODIMENTS

Figure 1:
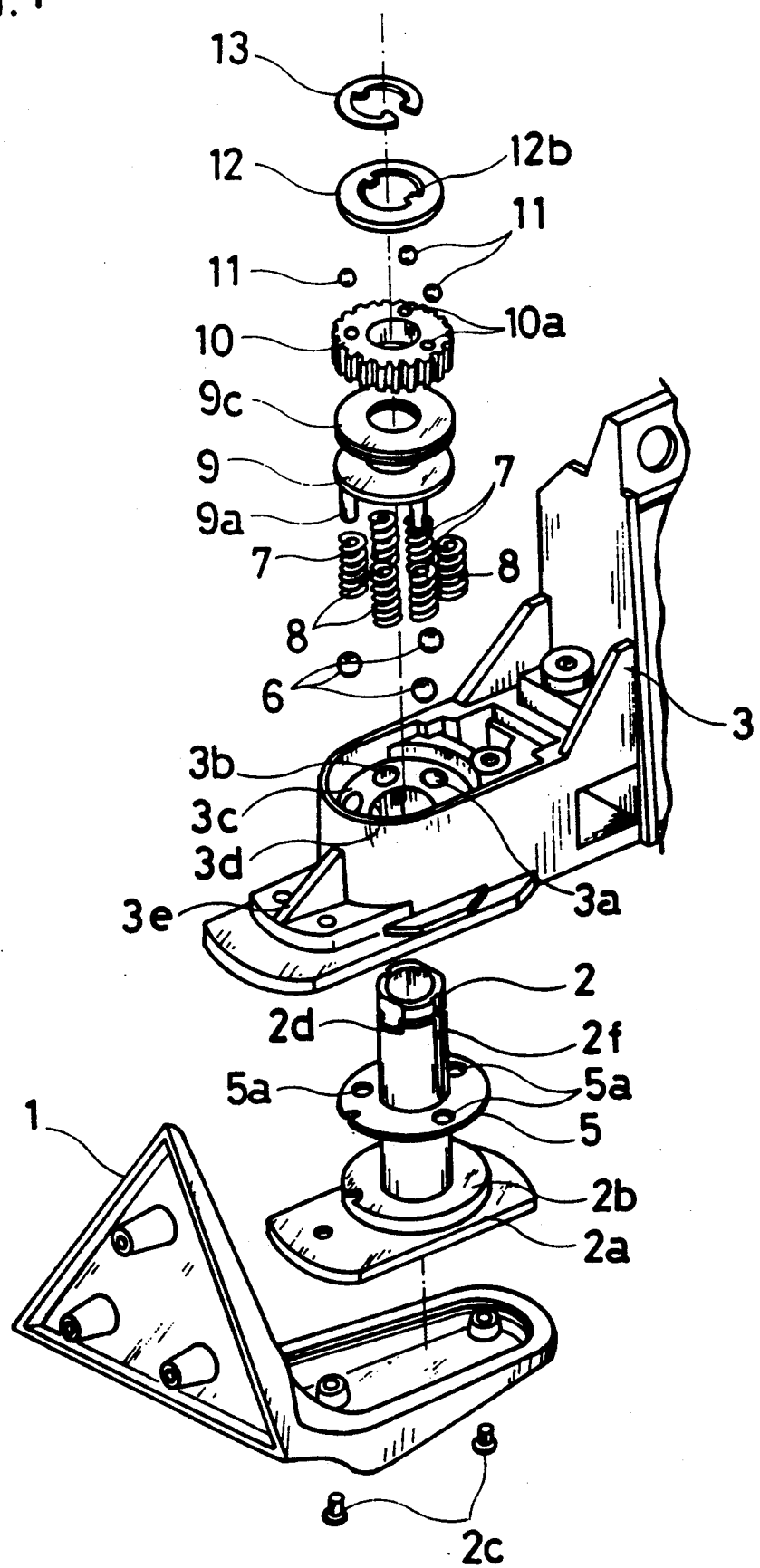
FIG. 1 is an exploded perspective view of main parts of a torque limiter arrangement for a rotating device embodying this invention.
Figure 2:
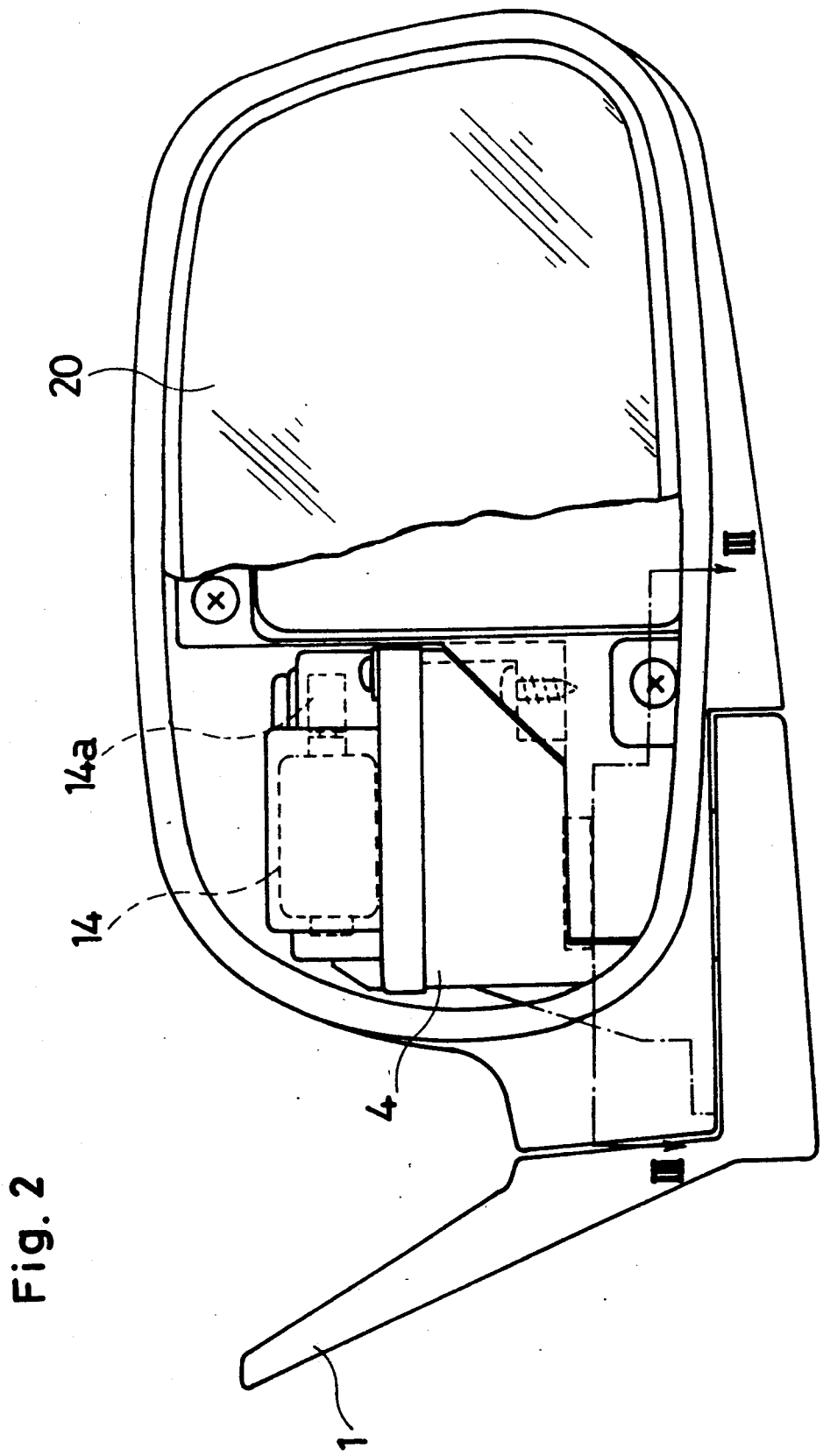
FIG. 2 is a front view of a door mirror, partly broken away for clarity, accommodating the torque limiter arrangement therein.
Figure 3:
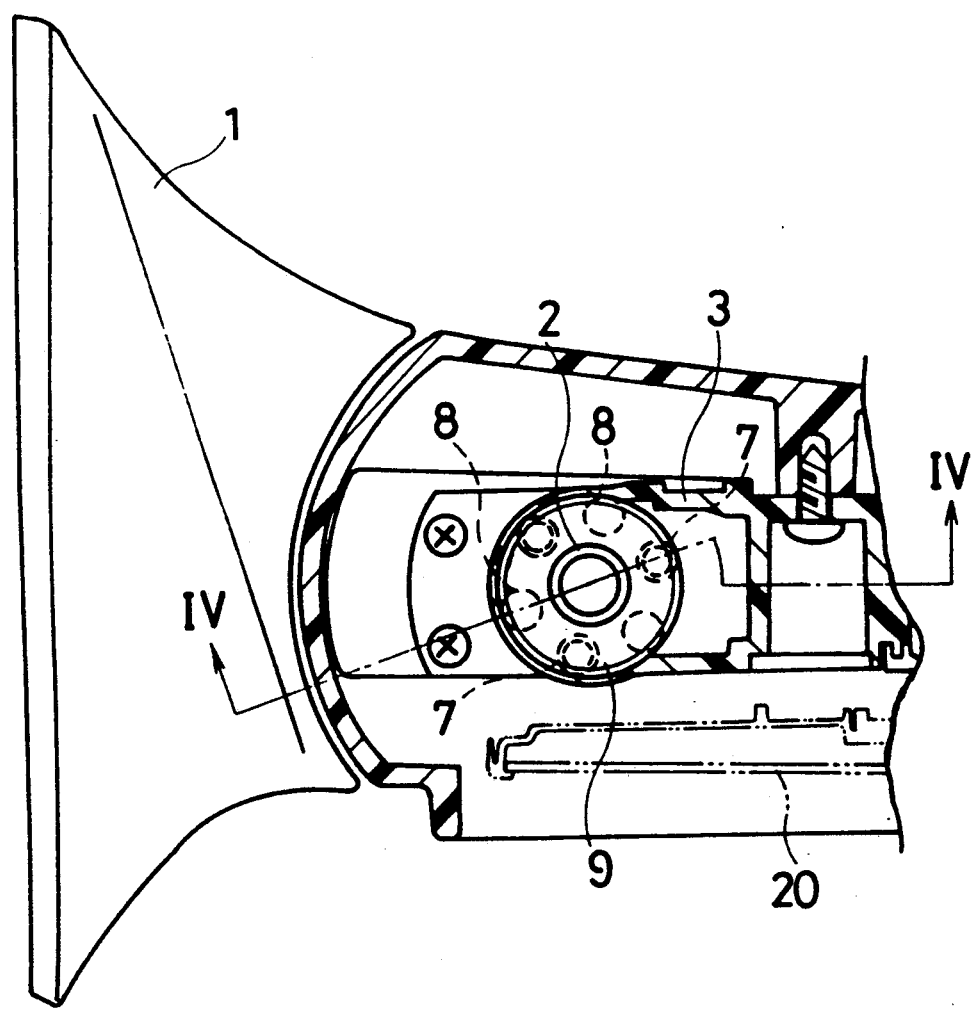
FIG. 3 is a fragmentary sectional view taken along the line III—III of FIG. 2.

Referring now to the drawings, wherein like reference characters designate like or corresponding parts throughout the several views, an embodiment of this invention will be described hereafter while concretized in a torque limiter arrangement used for a door mirror.

In FIG. 1, a stay 1 as a fixed body is adapted to attach the door mirror to a car body. A shaft 2, defining a rotation axis in this embodiment, stands on the stay 1. A mount 2a is fitted to the bottom of the stay 1 by screws 2c. The shaft 2 is inserted into a bore 2e of the mount 2a and joined integrally thereto. A regulating plate 5 of ring shape is disposed on a flat surface 2b that corresponds to the lower end of the shaft 2. The regulating plate 5 is fixed to the flat surface 2b so as to make one body therewith. Preferably, the regulating plate 5 has fitting holes 5a, three in this embodiment, bored at fixed intervals in the circumferential direction. Thus, pockets 5b are defined between the circumferential surfaces of the fitting holes 5a and the flat surface 2a.

A frame 3 as a rotational body, preferably made of synthetic resin, is attached rotatably to the shaft 2 via a bore 3d of a boss 3c. The boss 3c has through holes 3a around the bore 3d. Each through hole 3a corresponds to the pocket 5b of the regulating plate 5 when the frame 3 is in in a preset position like a retracted position or a return position in relation to the stay 1. The boss 3c has blind holes 3b between adjacent through holes 3a. Preferably, the same number of through holes 3a and the blind holes 3b are alternately arranged at predetermined intervals. Each though hole 3a accommodates therein a ball 6 and a spring 7. The ball 6 is engageable with the pocket 5b while in the though hole 3a. The spring 7 has its lower end contacted with the upper surface of the ball 6. When the frame 3 is in the preset position relative to the stay 1, the balls 6 are pressingly engaged with the pockets 5b. A spring 8 is inserted in each blind hole 3b. Preferably, compressed coil springs are used as the springs 7, 8.

A spring holder 9 is fitted to the shaft 2 from the upside of the boss 3c. The spring holder 9 has insertion legs 9a formed at positions corresponding to the through holes 3a. The holder 9 further has protrusions 9b as urging pieces formed at positions corresponding to the blind holes 3b. Each insertion leg 9a is inserted into the spring 7 while the lower surface of the holder 9 is contacted with the upper end of the spring 7. The protrusion 9b is inserted into the blind hole 3b so as to contact the upper end of the spring 8 to urge it, thus setting resilient force thereof into a desired value.

A desired number of washers 9c are arranged on the shaft 2 at the upside of the spring holder 9. A clutch gear 10 is mounted on the top of the washers 9c while being rotatably attached around the shaft 2. The clutch gear 10 has accommodation recesses 10a formed in the circumferential direction on the upper surface thereof. Balls 11 are embedded in the accommodation recesses 10a, respectively. Preferably, a plurality of accommodation recesses 10a, three in this embodiment, are arranged at prescribed interval. A ring base plate 12 is faced to the clutch gear 10 on the shaft 2. The base plate 12 has its inward engaging lugs 12b inserted into longitudinal grooves 2f of the shaft 2 so as to be immovable in the circumferential direction of the shaft 2. The base plate 12 further has pockets 12a formed on the lower surface thereof. The pockets 12a are usually engaged with the balls 11. A retainer ring E-type 13 is fitted in a ring groove 2d of the shaft 2 for the purpose of fixing the base plate 12 in the axial direction.

Figure 4:
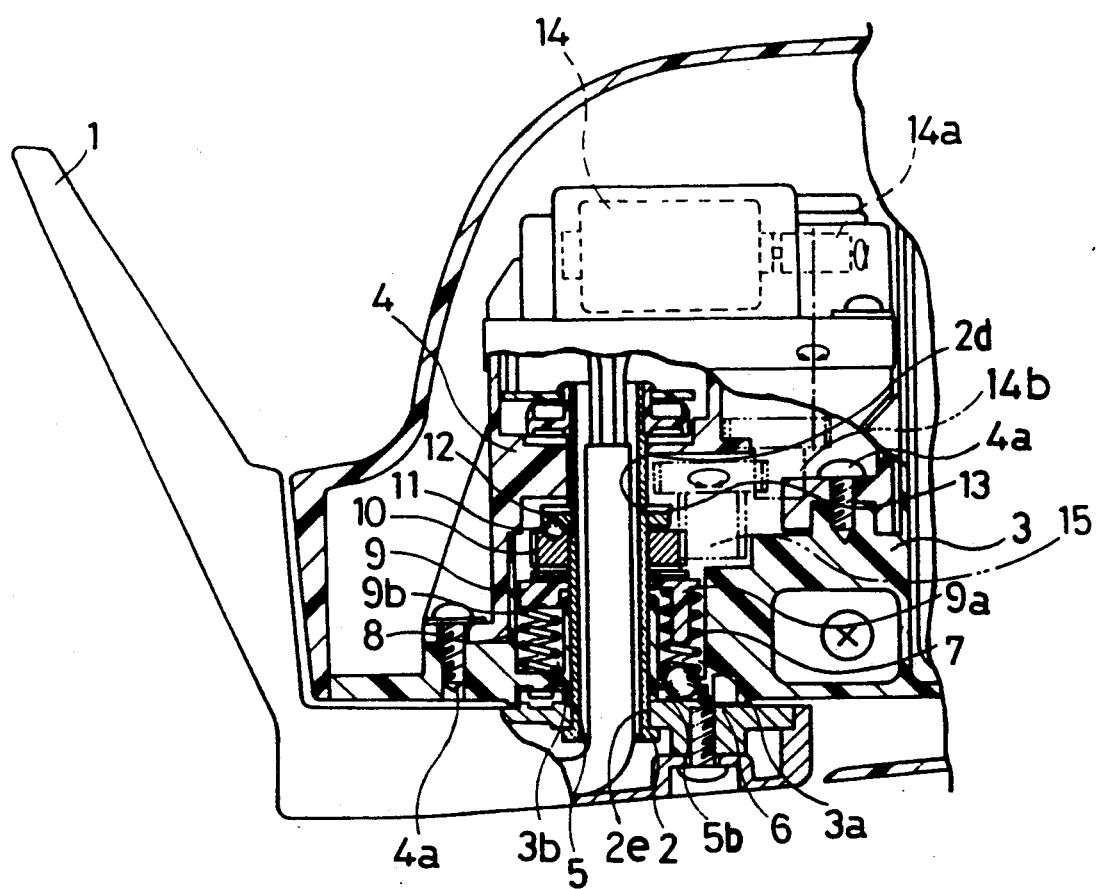
FIG. 4 is a fragmentary vertical section taken along the line IV—IV of FIG. 3.

As illustrated in FIG. 4, a gear housing 4, preferably made of synthetic resin, is attached rotatably on the shaft 2 over the retainer ring 13. The gear housing 4 is connected integrally with the frame 3 by screws 4a. A motor 14 is fixed in the gear housing 4. Rotation of the motor 14 is transmitted to an intermediate gear 15 via a worm 14a and desired number of gears (only one gear 14a is shown for clarity). The intermediate gear 15 is meshed with the clutch gear 10 and rotated relative to the gear 10 in accordance with the rotation of the motor 14. A drive unit is constituted by the motor 14, the worm 14a, the gears 14b and the intermediate gear 15.

In the present embodiment, the regulating plate 5 and the ball 6 constitute a first clutch. The first clutch and the springs 7 define a first torque limiter. The ball 11 and the base plate 12 form a second clutch. The second clutch and the springs 7 and 8 constitute a second torque limiter. The boss 3c of the frame 3 forms part of an actuator case for accommodating the first and second torque limiters.

In the torque limiter arrangement of this embodiment, when assembled, there are overlayed one by one, on the shaft 2, the frame 3 with the ball 6 and the springs 7 and 8, the spring holder 9, the washers 9c, the clutch gear 10 with the ball 11, and the base plate 12. Moreover, the base plate 12 is pressed downward against the resilient force of the springs 7 and 8, while being restrained from moving along the axis of the shaft 2, by the retainer ring 13.

In the above assembled state, downward resilient force of the springs 7 acts on the regulating plate 5 on the stay 1 through the balls 6. Downward resilient force of the springs 8 is effected on the frame 3 via the three blind holes 3b. Upward resilient force of the springs 7 and 8 operates on the base plate 12 via the spring holder 9, the clutch gear 10 and the balls 11.

Namely, the springs 7 urge the balls 6 downward to press the lower surfaces thereof against the inner surfaces of the pockets 5b of the regulating plate 5. This downward urging force by the springs 7 determines a release torque T1 of the first torque limiter. On the other hand, both the springs 7 and 8 press the balls 11 against the inner surfaces of the pockets 12a. These upward urging forces by the springs 7 and 8 determine a release torque T2 of the second torque limiter. Here, the downward urging force of the springs 8 acts only on the frame 3, but never operates on the balls 6 and the regulating plate 5 that constitute the first torque limiter.

The release torque T1 of the first torque limiter is set smaller than the release torque T2 of the second torque limiter. More specifically, a desired ratio of the release torque T1 to the release torque T2 is between 1:1.5 and 1:2 in this embodiment.

The torque limiter arrangement described above operates as follows.

When the motor 14 is rotated in the normal or reverse direction, the worm 14a is rotated and transmits a torque, that is larger than the preset release torque T1 but smaller than the present release torque T2, to the clutch gear 10 via the gears 14b and 15. The clutch gear 10 conducts the torque to the base plate 12 through the balls 11 and is forced to rotate relative to the plate 12. Still, since the torque of the clutch gear 10 is less than the release torque T2, the balls 11 are held in and do not go out of the pockets 12a by the pressing force of the springs 7 and 8. Thus, the second torque limiter is not released and does not permit the relative rotation of the clutch gear 10 to the base plate 12. Namely, at this time, the shaft 2, the base plate 12 and the clutch gear 10 are joined together so as not to make any relative rotation.

On the other hand, the intermediate gear 15 is rotated relative to the clutch gear 10. However, since the clutch gear 10 is prevented from rotation by the second torque limiter, the intermediate gear 15 rotates on its axis while revolving around the clutch gear 10.

Moreover, the torque, that is not less than the release torque T1, is applied to the first torque limiter or between the balls 6 and the regulating plate 5. Then, the balls 6 get out of the pockets 5b against the pressing force of the spring 7. Thus, the first torque limiter is released to permit the frame 3 to rotate relative to the stay 1. Thereby, in accordance with the revolution of the intermediate gear 15, the frame 3 makes relative rotation to the stay 1 about the shaft 2 in the retracting or returning direction via the gears 14b, the worm 14a, the motor 14 and the gear housing 4.

The release torque T1 of the first torque limiter increases due to dirt stick, freezing, or the like between the balls 6 and the regulating plate 5. If the release torque T1 exceeds thereby the release torque T2 of the second torque limiter, contrary to the above, the second torque limiter is released without the first torque limiter released. That is, when the intermediate gear 15 is rotated by the motor 14 to transmit its rotation to the clutch gear 10, the balls 11 go out of the pockets 12a of the base plate 12 against the urging force of the springs 7 and 8. Then, the balls 11 slide on the lower surface of the base plate 12, so that the clutch gear 10 is rotated relative to the base plate 12 as well as the shaft 2. In other words, the clutch gear 10 runs idle between the intermediate gear 15 and the shaft 2. Thus, the driving force from the motor 14 is absorbed in the clutch gear 10 and is not effected on the first torque limiter that has not been released. As a result, the motor 14 is prevented from overload. Moreover, there is no change in the relative position of the intermediate gear 15 to the clutch gear 10, so that the frame 3 is never rotated relative to the stay 1.

In case the frame 3 is hindered from rotating by obstacles during the rotation of the motor 14, the release torque T1 is made higher than the release torque T2. Thus, the second torque limiter is released while the first torque limiter cannot be released in that state, so that the same effects as above are obtained.

When the frame 3 is rotated to and stopped at the preset position, the balls 6 are again engaged with the pockets 5b of the regulating plate 5. Thereby, the first torque limiter recovers the release torque T1 or the largest rotational resistance. Therefore, even when the motor 14 stops rotating, the frame 3 is not influenced by external force like wind and can be stably maintained in the stopped position.

Another operation will be described hereafter in which, when the motor 14 is not rotated, the frame 3 is applied with such external force by hands or the like as rotating it about the shaft 2 in the retracting or returning direction. In this case, when a torque by the external force becomes not less than the release torque T1, the first torque limiter is released. Then, the torque, effected on the frame 3, is transmitted to the intermediate gear 15 through the gear housing 4, the motor 14 and the like. Thus, a relative torque is generated between the intermediate gear 15 and the clutch gear 10. As far as the torque is less than the release torque T2, the second torque limiter is not released. Therefore, where the torque is not less than the release torque T1 but is less than the release torque T2, the intermediate gear 15 must rotate on its axis while revolving around the clutch gear 10 in order to rotate the frame 3 about the shaft 2. However, as is well known, it is impossible to drive and rotate the worm 14a from the side of the intermediate gear 15. That is, the worm 14a keeps the intermediate gear 15 from rotating on its axis. The intermediate gear 15, that is prevented from rotation, cannot revolve around the clutch gear 10, accordingly. As a result, the frame 3 is not rotated relative to the stay 1.

When the torque to the frame 3 increases and reaches the release torque T2 or more, the second torque limiter is released so as to permit the intermediate gear 15 to rotate relative to the shaft 2. Subsequently, though the intermediate gear 15 is still hindered from rotating on its axis, it can revolve around the clutch gear 10 via the relative rotation to the gear 10. Thus, the frame 3 is rotated relative to the stay 1.

In case, when the motor 14 is worked, external force is effected on the frame 3 such as to rotate it against the rotation of the motor 14, the same results as above can be obtained in accordance with degree of the external force.

As described above, with the torque limiter arrangement of the present embodiment, it is possible to determine independently the release torque T1 of the first torque limiter and the release torque T2 of the second torque limiter by use of two kind of individually provided springs 7 and 8. Thereby, with appropriately selected springs 8, the urging force by the springs 7 and 8 to the second torque limiter can be made much bigger than the urging force by the springs 7 to the first torque limiter. Thus, it is easily realized to get sufficiently large difference between the release torques T1 and T2. Accordingly, the release torques T1 and T2 can be set at such values as there arises no reverse in the values even if the release torque T2 decrease relative to the release torque T1. Namely, if the edges of the pockets 12a are abraded in long use thereby to lessen the release torque T2, or if the release torque T1 becomes higher than the preset value due to abrasion, rattles, dirt stick or the like, the release torque T2 can be kept always larger than the release torque T1. As a result, there is no possibility that the release torque T1 becomes larger than the release torque T2 thereby to disable control of the rotation of the mirror.

Further, the difference between the release torques T1 and T2 is determined not by the engaging depth of the balls in the pockets like the conventional arrangement, but by the springs 7 and 8. Moreover, the difference between the torques T1 and T2 can be enough large by the springs 7 and 8. Accordingly, the arrangement of this embodiment is capable of making smaller the engaging depth of the balls 11 in the pockets 12a. Thereby, it is possible to diminish the influence caused by the decrease of the engaging depth of the balls 11 in the pockets 12a in long use, so that the change of the torques T1 and T2 can be small.

The springs 7 and 8 are arranged around the shaft 2 while accommodated in the holes 3a and 3b of the boss 3c. Therefore, a rib 3e can be formed on the outer surface of the actuator case for the first and second torque limiters in order to reinforce the case. Thus, the actuator case can be formed of synthetic resin.

This invention may be practiced or embodied in still other ways without departing from the spirit or essential character thereof. For instance, while a door mirror is attached as a driven element to the rotatable frame 3 in the illustrated preferred embodiment, the driven element may be in other form than the door mirror in embodying the present invention. Moreover, the door mirror in the above embodiment is shown only as one example in which the driven element is disposed on a rotating member. Therefore, the driven member may be arranged on a fixed member. As an example thereof, this invention can be concretized in a torque limiter arrangement for a belt reacher or the like.

The first torque limiter, for a relative rotation of the frame 3 to the stay 1 upon application of a fixed torque, is not limited in the form described in the present embodiment. Namely, the first torque limiter is not necessarily disposed between the frame 3 and the stay 1 on the shaft 2 or may have another structure. This is also the case of the second torque limiter. Moreover, the torque limiter may be other than ball-and-pocket type torque limiter of this embodiment. For instance, a tooth type torque limiter may be used instead thereof.

The springs 7, to determine the resilient force for starting relative rotation of the first torque limiter, may be in another number or form, though the three springs 7 are disposed around the shaft 2 in the present embodiment. Moreover, the springs 8, to determine the resilient force for starting relative rotation of the second torque limiter, may be in another number or form, though the three springs 8 are disposed around the shaft 2 in addition to the springs 7 in the present embodiment. For example, it is possible to arrange two springs of different diameters concentrically about the shaft 2. In this case one spring is operated on the first and second torque limiters via an appropriately selected interposed member. On the other hand, the other spring is operated on the second torque limiter via another appropriately selected interposed member. Thereby, the release torque T2 is set sufficiently larger than the release torque T1.

It is apparent that the difference between the release torques T1 and T2 may be obtained by changing the engaging depths of the balls 6 and 11 in the pockets 5b and 12a in addition to the difference of the urging force of the springs 7 and 8.

The preferred embodiment described herein is therefore illustrative and not restrictive, the scope of the invention being indicated by the appended claims and all variations which come within the meaning of the claims are intended to be embraced therein.

What is claimed is:

1. A torque limiter arrangement, for a rotating device, adapted to control relative rotation between a fixed element and a rotational element operatively connected to a drive unit, comprising:
    a first clutch disposed between said fixed element and said rotational element and releasable upon application of a relative torque not less than a predetermined first torque between the fixed element and the rotational element;
    a second clutch disposed between said fixed element and said rotational element and releasable upon application of a relative torque not less than a predetermined second torque between the fixed element and the rotational element;
    a first biasing means operatively connected with the first clutch to determine the first torque; and
    a second biasing means operatively connected with the second clutch to determine the second torque;
    wherein the second biasing means provides a biasing force greater than a biasing force provided by the first biasing means to such a degree that the second torque is always larger than the first torque,
    wherein said first and second biasing means include at least one first spring operatively connected between and acting on the first and second clutches, and at least one second spring operatively connected with and acting only on the second clutch, and
    wherein said first biasing means is comprised solely of said at least one first spring acting on said first clutch and said second biasing means is comprised of said at least one first spring and said at least one second spring acting together on said second clutch.

2. A torque limiter arrangement according to claim 1, in which:
    the first clutch includes a regulating plate having first pockets and fixed on a shaft secured on the fixed element, and fire balls engageable with the first pockets;
    the second clutch includes a base plate having second pockets and fixed on the shaft, and second balls engageable with the second pocket;
    a plurality of first springs interposed between the first and second balls for applying force to said first and second balls; and
    a plurality of second springs interposed between said rotation member and the second balls for applying a force to the second balls.

3. A torque limiter arrangement according to claim 2, in which the rotational element has a plurality of through holes each accommodating therein each first spring, respectively.

4. A torque limiter arrangement according to claim 3, in which the rotational element has a plurality of blind holes each accommodating therein each second spring, respectively.

5. A torque limiter arrangement according to claim 4, in which the rotational element has a reinforcing rib located outwardly of the through holes and the blind holes.

6. A torque limiter arrangement according to claim 4, in which the first and second springs are coil springs, and the torque limiter arrangement further comprises a spring holder interposed between the rotational element and the second clutch, the spring holder including insertion legs each inserted into each first coil spring in each through hole and urging pieces each engaging each second spring.

7. A rotating device comprising:
    a stay having a shaft thereon;
    a first clutch including a regulating plate fixed on a base end of the shaft and having at least three first pockets arranged in a circumferential direction of the shaft, and first balls engageable with the first pockets;
    a second clutch including a base plate fixed on a free end of the shaft and having at least three second pockets arranged in the circumferential direction of the shaft, and second balls engageable with the second pockets;
    a frame having a boss attached rotatably to the shaft between the first and second clutches;
    the boss having at least three through holes extending along an axis of the shaft so as to correspond to the first pockets, and at least three blind holes extending along the axis of the shaft with a closed end of each blind hole disposed adjacent to the base end of the shaft;
    first springs each inserted into a respective through hole to urge the first ball toward the regulating plate as well as to urge the second ball toward the base plate; and
    second springs each accommodated in a respective blind hole to urge the second ball toward the base plate;
    wherein a biasing force of the second springs is set at such a value that a combined biasing force of the first and second springs is larger than a biasing force of the first springs so that a release torque of the second clutch is always larger than a release torque of the first clutch.

* * * * *